(12) United States Patent
Meyer et al.

(10) Patent No.: US 9,285,390 B2
(45) Date of Patent: Mar. 15, 2016

(54) OPTICAL ACCELEROMETER SYSTEM

(71) Applicants: A. Douglas Meyer, Woodland Hills, CA (US); Michael D. Bulatowicz, Canoga Park, CA (US); Michael S. Larsen, Woodland Hills, CA (US); Robert C. Griffith, Woodland Hills, CA (US)

(72) Inventors: A. Douglas Meyer, Woodland Hills, CA (US); Michael D. Bulatowicz, Canoga Park, CA (US); Michael S. Larsen, Woodland Hills, CA (US); Robert C. Griffith, Woodland Hills, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 343 days.

(21) Appl. No.: 13/907,333

(22) Filed: May 31, 2013

(65) Prior Publication Data
US 2013/0327146 A1 Dec. 12, 2013

Related U.S. Application Data

(60) Provisional application No. 61/656,311, filed on Jun. 6, 2012, provisional application No. 61/670,861, filed on Jul. 12, 2012.

(51) Int. Cl.
- *G01P 15/08* (2006.01)
- *G01P 15/093* (2006.01)
- *G01P 15/18* (2013.01)

(52) U.S. Cl.
CPC ............... *G01P 15/093* (2013.01); *G01P 15/08* (2013.01); *G01P 15/18* (2013.01)

(58) Field of Classification Search
CPC ... G01P 15/093; G01P 15/18; G01P 15/0802; G01P 15/0888; G01P 15/14

USPC .......... 73/514.26, 514.27; 356/505, 506, 498, 356/499
See application file for complete search history.

(56) References Cited

U.S. PATENT DOCUMENTS

| | | | |
|---|---|---|---|
| 3,789,674 A * | 2/1974 | Anderson et al. .......... | 73/514.26 |
| 4,048,859 A | 9/1977 | Babcock | |
| 4,226,120 A * | 10/1980 | Nissl .......................... | 73/514.26 |
| 5,326,983 A * | 7/1994 | Hejazi ........................ | 250/589 |
| 6,763,718 B1 * | 7/2004 | Waters et al. .............. | 73/514.26 |
| 7,139,446 B2 * | 11/2006 | Slotwinski ..................... | 385/12 |
| 7,222,534 B2 * | 5/2007 | Maas et al. ................. | 73/514.26 |
| 7,355,720 B1 * | 4/2008 | Carr .............................. | 356/498 |
| 7,751,042 B2 | 7/2010 | Okuno | |
| 7,826,629 B2 | 11/2010 | Miles et al. | |
| 8,201,452 B2 * | 6/2012 | Oldsen et al. .............. | 73/514.26 |
| 8,205,497 B1 * | 6/2012 | Okandan et al. ........... | 73/514.26 |

(Continued)

FOREIGN PATENT DOCUMENTS

| EP | 0553877 A1 | 8/1993 |
|---|---|---|
| WO | WO 2010/094190 A1 | 8/2010 |

*Primary Examiner* — Helen Kwok
(74) *Attorney, Agent, or Firm* — Tarolli, Sundheim, Covell & Tummino LLP

(57) ABSTRACT

One embodiment includes an accelerometer system. The system includes a laser configured to emit an optical beam at a linear polarization. The system also includes an optical cavity system. The optical cavity system includes a mirror that is coupled to an accelerometer housing via a spring and is configured to reflect the optical beam. The optical cavity system also includes at least one photodetector configured to receive at least a portion of at least one of the optical beam and the reflected optical beam and to generate an acceleration signal that is indicative of motion of the mirror resulting from an external acceleration acting upon the accelerometer housing. The system further includes an acceleration processor configured to calculate a magnitude of the external acceleration based on the acceleration signal.

21 Claims, 8 Drawing Sheets

(56) References Cited

U.S. PATENT DOCUMENTS

| | | |
|---|---|---|
| 2003/0081218 A1 | 5/2003 | Orban |
| 2004/0149037 A1* | 8/2004 | Digonnet et al. .......... 73/514.26 |
| 2006/0032471 A1 | 2/2006 | Yalin et al. |
| 2006/0181712 A1* | 8/2006 | Degertekin et al. .......... 356/505 |
| 2007/0261489 A1* | 11/2007 | Murelitharan ............. 73/514.01 |
| 2008/0163686 A1* | 7/2008 | Carr ........................... 73/514.26 |
| 2008/0291457 A1 | 11/2008 | Carr |
| 2009/0122319 A1 | 5/2009 | Ronnekleiv et al. |
| 2009/0268211 A1* | 10/2009 | Carr et al. ..................... 356/498 |
| 2010/0046002 A1* | 2/2010 | Perez et al. ................... 356/478 |
| 2011/0292321 A1 | 12/2011 | Travis et al. |
| 2011/0303008 A1 | 12/2011 | Zhang et al. |
| 2012/0116709 A1* | 5/2012 | Martin et al. ................. 702/141 |

* cited by examiner

OPTICAL ACCELEROMETER SYSTEM

RELATED APPLICATIONS

The present invention claims priority from U.S. Provisional Patent Application No. 61/656,311, entitled "OPTICAL ACCELEROMETER SYSTEM", filed Jun. 6, 2012, and from U.S. Provisional Patent Application No. 61/670,861, entitled "OPTICAL ACCELEROMETER SYSTEM", filed Jul. 12, 2012, both of which are incorporated herein by reference in their entirety.

TECHNICAL FIELD

The present invention relates generally to sensor systems, and specifically to an optical accelerometer system.

BACKGROUND

Many types of instruments have been developed for measuring acceleration. One such example is a force-balanced accelerometer. For example, in a pendulous electrostatic force-balanced accelerometer, electrostatic forcing in a closed loop system is employed to position and obtain an output from a pendulous inertial mass or proof mass. The electrostatic forcing system may employ a capacitive pickoff electrode on each side of a pendulous member that has been etched from a silicon substrate. A control pulse can be employed to sequentially apply a constant amount of charge to each electrode. A variable force can be applied to the inertial mass by varying the amount of time (e.g., duty cycle) the charge is left on a respective plate. The amount of time the charge is left on a respective plate is based on the displacement of the inertial mass relative to a null position. However, electrostatic force-balanced accelerometers can be subject to a number of deleterious phenomena, such as accelerometer bias uncertainty which can be a major source of error in inertial measurement and/or navigation systems. Bias uncertainty can arise due to transient behavior at turn on, non-modelability, and instability of bias versus temperature characteristics including hysteresis and simply trend over time. In addition, pendulous electrostatic force-balanced accelerometers can be subject to damage from excessive input accelerations that can result in changes in the bias and scale-factor, which could require additional calibration of the accelerometer.

SUMMARY

One embodiment includes an accelerometer system. The system includes a laser configured to emit an optical beam at a linear polarization. The system also includes an optical cavity system. The optical cavity system includes a mirror that is coupled to an accelerometer housing via a spring and is configured to reflect the optical beam. The optical cavity system also includes at least one photodetector configured to receive at least a portion of at least one of the optical beam and the reflected optical beam and to generate an acceleration signal that is indicative of motion of the mirror resulting from an external acceleration acting upon the accelerometer housing. The system further includes an acceleration processor configured to calculate a magnitude of the external acceleration based on the acceleration signal.

Another embodiment includes a method for measuring acceleration. The method includes generating an optical beam at a linear polarization. The method also includes providing the optical beam in an optical cavity system comprising a mirror that is coupled to an accelerometer housing via a spring and is configured to reflect the optical beam. The method also includes generating an acceleration signal via at least one photodetector configured to receive at least a portion of at least one of the optical beam and the reflected optical beam. The acceleration signal can be indicative of motion of the mirror resulting from an external acceleration acting upon the accelerometer housing. The method further includes calculating a magnitude of the external acceleration based on comparing a frequency of the acceleration signal relative to a reference frequency.

Another embodiment includes an accelerometer system. The system includes a plurality of optical accelerometer detection systems that each correspond to one of a plurality of orthogonal axes. Each of the plurality of optical accelerometer detection systems includes a laser configured to emit an optical beam at a linear polarization that periodically transitions between a first linear polarization and a second linear polarization in response to a reflected portion of the optical beam. Each of the plurality of optical accelerometer detection systems also includes an optical cavity system. The optical cavity system includes a quarter-wave plate arranged between the laser and the mirror and configured to convert the optical beam from one of the first and second linear polarizations to a circular-polarization and to convert the reflected optical beam from the circular-polarization to the other of the first and second linear polarizations. The optical cavity system also includes a mirror that is coupled to an accelerometer housing via a spring and is configured to reflect the optical beam to provide the reflected optical beam. The optical cavity system further includes at least one photodetector configured to receive at least a portion of at least one of the optical beam and the reflected optical beam to generate an acceleration signal that is indicative of motion of the mirror resulting from an external acceleration acting upon the accelerometer housing in a respective one of the plurality of orthogonal axes. The optical cavity system further includes an acceleration processor configured to calculate a magnitude of the external acceleration based on the acceleration signal of each of the plurality of optical accelerometer detection systems.

DETAILED DESCRIPTION

The present invention relates generally to sensor systems, and specifically to an optical accelerometer system. The optical accelerometer system includes a laser, which could be configured as a vertical-cavity surface-emitting laser (VCSEL), that is configured to generate an optical beam at a first linear polarization (i.e., parallel or perpendicular). The optical accelerometer system also includes an optical cavity system that includes a mirror and at least one photodetector. The mirror can be coupled to an accelerometer housing via a spring and is configured to reflect the optical beam back toward the laser. The photodetector(s) can substantially surround and can be arranged substantially planar with a gain medium associated with the laser, such that the reflected optical beam is received at both the gain medium of the laser and at the photodetector(s). The reflected optical beam can be received at a second linear polarization opposite the first linear polarization (i.e., perpendicular or parallel, respectively). For example, the optical cavity system can include a quarter-wave plate arranged between the laser and the mirror, such that the quarter-wave plate can convert the optical beam from the first linear polarization to a circular-polarization and convert the reflected optical beam from the circular-polarization to the second linear polarization, and vice-versa.

The reflected optical beam can thus stimulate the gain medium of the laser to periodically oscillate between emitting the optical beam at the first linear polarization and the second linear polarization. Therefore, the photodetector(s) can be configured to detect the periodic oscillation based on transitions between the first and second linear polarizations of the optical beam. The photodetector(s) can be configured to generate an acceleration signal that has a frequency associated with the periodic oscillation. The frequency of the periodic oscillation can vary based on an external acceleration acting upon the accelerometer housing. The system can further include an acceleration processor that is configured to calculate the magnitude of the external acceleration based on the frequency of the acceleration signal.

Figure 1:
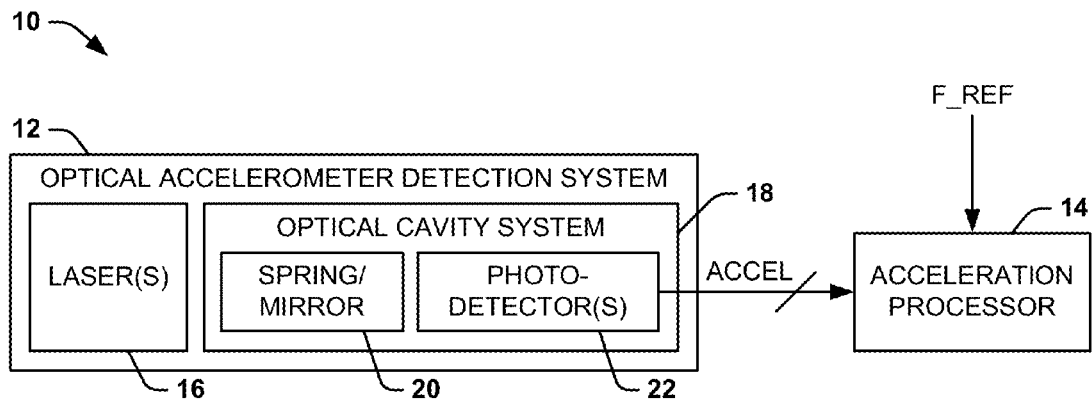
FIG. 1 illustrates an example of an optical accelerometer system.

FIG. 1 illustrates an example of an optical accelerometer system 10. The optical accelerometer system 10 can be implemented in any of a variety of applications, such as for navigation and/or guidance systems. Thus, the optical accelerometer system 10 can be configured to calculate an external acceleration acting upon the optical accelerometer system 10. As described herein, an external acceleration is defined as an acceleration of a physical housing of the optical accelerometer system 10 resulting from an external force that is applied to the physical housing of the optical accelerometer system 10, and can include gravity as well as accelerations resulting from other external forces.

The optical accelerometer system 10 includes an optical accelerometer detection system 12 and an acceleration processor 14. The optical accelerometer detection system 12 is configured to detect motion resulting from an external force that is applied to an accelerometer housing to which the optical accelerometer detection system 12 is physically coupled. The optical accelerometer detection system 12 includes at least one laser 16 and an optical cavity system 18. The laser(s) 16 can be configured, for example, as vertical-cavity surface-emitting laser(s) (VCSEL), such as including a gain medium that includes perpendicular stimulation axes. The laser(s) 16 are configured to generate an optical beam that alternates between linear polarizations, as described in greater detail herein. For example, the laser(s) 16 can alternate between a first linear polarization, which could be a parallel polarization (i.e., p-polarization) relative to a first stimulation axis of the gain medium of the laser(s) 16, and a second linear polarization, which could be a perpendicular polarization (i.e., s-polarization) relative to the first stimulation axis of the gain medium of the laser(s) 16.

In the example of FIG. 1, the optical cavity system 18 includes a spring-mounted mirror 20 and one or more photodetectors 22. The mirror 20 can be mounted to an accelerometer housing via a spring, such that the mirror 20 can move relative to the accelerometer housing in response to an external acceleration of the accelerometer housing, such as in response to an external force. The mirror 20 is configured to reflect the optical beam emitted from the laser(s) 16 toward the photodetector(s) 22 to be received at the photodetector(s) 22 at the opposite polarization of that which is emitted from the laser(s) 16 (e.g., the parallel or the perpendicular polarization). As an example, the mirror 20 can also reflect the optical beam back to the laser(s) 16, such as to stimulate an orthogonal stimulation axis of the gain medium of the laser(s) 16, such as to cause the laser(s) 16 to periodically oscillate between emission of one of the parallel and perpendicular polarization and emission of the other of the parallel and perpendicular polarization.

The photodetector(s) 22 can thus be configured to measure an intensity of the reflected optical beam and to generate a respective at least one acceleration signal ACCEL. As an example, the acceleration signal(s) ACCEL can have a frequency that corresponds to the periodic oscillation between the emission of the parallel and perpendicular polarizations from the laser(s) 16. The frequency of the acceleration signal(s) ACCEL can thus vary in response to motion of the mirror 20 relative to the accelerometer housing in response to the external acceleration. Therefore, the acceleration signal(s) ACCEL can be indicative of the presence of the external acceleration. The acceleration signal ACCEL is provided to the acceleration processor 14 that is configured to calculate the magnitude of the external acceleration based on the frequency of the acceleration signal ACCEL. For example, the acceleration processor 14 can compare the frequency of the acceleration signal ACCEL with a predetermined reference frequency F_REF. Therefore, the accelerometer system 10 can be configured to calculate a magnitude of external acceleration in at least one dimension based on the acceleration processor 14.

Figure 2:
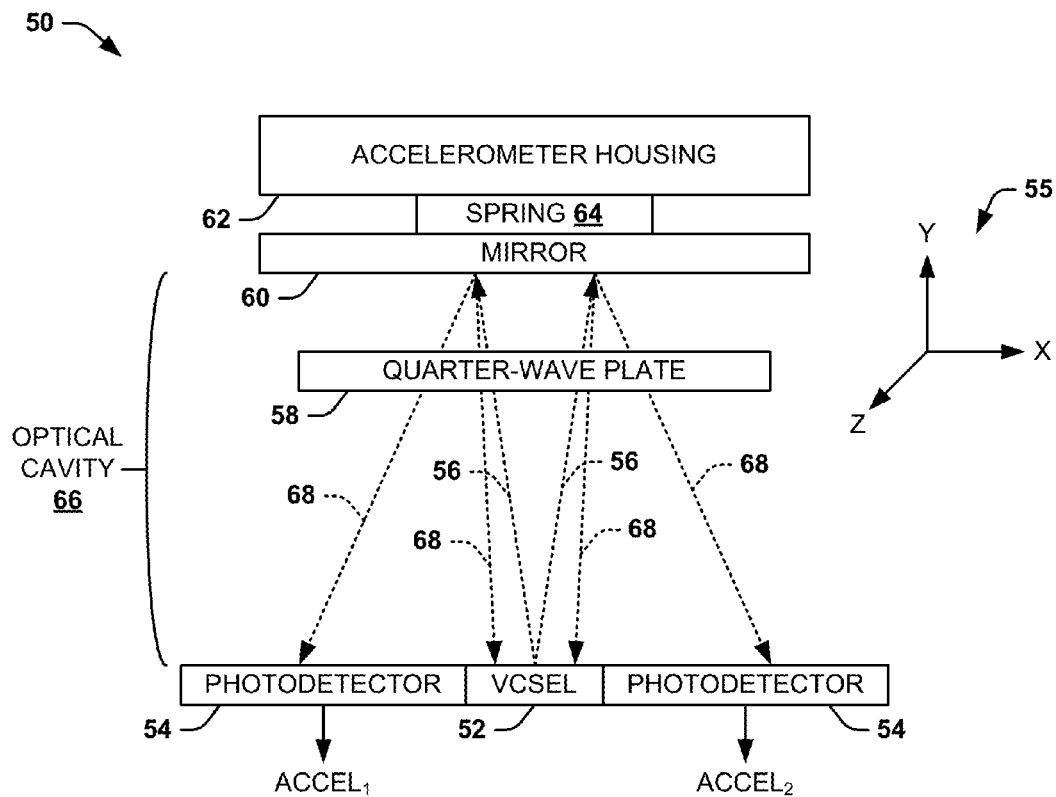
FIG. 2 illustrates an example of an optical accelerometer detection system.

FIG. 2 illustrates an example of an optical accelerometer detection system 50. The optical accelerometer detection system 50 can correspond to the optical accelerometer detection system 12 in the example of FIG. 1. Therefore, reference is to be made to the example of FIG. 1 in the following description of the example of FIG. 2.

The optical accelerometer detection system 50 includes a VCSEL 52 that is arranged substantially coplanar with a plurality of photodetectors 54. As an example, the photodetectors 54 can be configured as photodiodes that substantially surround the VCSEL 52 in an approximate X-axis plane, as demonstrated by the Cartesian coordinate system 55. The VCSEL 52 is configured to emit an optical beam 56 from an aperture in approximately the direction of the Y-axis, with the optical beam 56 having a linear polarization (i.e., parallel or perpendicular). In the example of FIG. 2, the optical accelerometer detection system 50 also includes a quarter-wave plate 58 in the optical path of the optical beam 56 emitted from the VCSEL 52. The quarter-wave plate 56 is therefore configured to provide a quarter-wave retardance to the optical beam 56 convert the optical beam 56 from the linear polarization to a circular polarization.

The optical accelerometer detection system 50 also includes a mirror 60 that is mounted to an accelerometer housing 62 by a spring 64. Therefore, the mirror 60 can move relative to the accelerometer housing 62, such as in response to an external acceleration acting upon the accelerometer housing 62. The distance along the Y-axis between the VCSEL 52 and the mirror 60 defines an optical cavity 66. Thus, the optical beam 56, having been converted to the circular polarization by the quarter-wave plate 58, reflects from the mirror 60 back to the quarter-wave plate 58 as a reflected beam 68. The quarter-wave plate 58 thus converts the reflected beam 68 back to the linear polarization. However, based on the additional quarter-wave retardance provided by the quarter-wave plate 58, the linear polarization of the reflected beam 68 is orthogonal to the polarization of the optical beam 56 emitted from the VCSEL 52. Therefore, if the optical beam 56 has a perpendicular polarization, the reflected beam 58 has a parallel polarization, and if the optical beam 56 has a parallel polarization, the reflected beam 58 has a perpendicular polarization.

The reflected beam 68 is provided back to the VCSEL 52 and to the photodetectors 54. The photodetectors 54 are thus configured to monitor an intensity of the reflected beam 68. As described previously, the VCSEL 52 can have a gain medium that includes stimulation axes that are approximately orthogonal with respect to each other. Therefore, upon the reflected beam 68 being provided to the VCSEL 52, the reflected beam 68 begins to stimulate the stimulation axis that corresponds to the polarization of the reflected beam 68, and thus the stimulation axis that is orthogonal with respect to the optical beam 56 that is emitted from the VCSEL 52. As a result of the stimulation of the orthogonal stimulation axis, the VCSEL 52 switches the linear polarization of the optical beam 56 to correspond to the stimulation axis that is stimulated by the reflected beam 68. Therefore, the linear polarization of the reflected beam 68 changes to the orthogonal polarization with respect to the optical beam 56 based on the passing of both the optical beam 56 and the reflected beam 68 through the quarter-wave plate. Accordingly, the VCSEL 52 oscillates between the linear polarizations (i.e., perpendicular and parallel) in providing the optical beam 56.

Each of the photodetectors 54 is configured to generate an acceleration signal ACCEL, demonstrated as acceleration signals $ACCEL_1$ and $ACCEL_2$ in the example of FIG. 2, that correspond to the intensity of the reflected beam 68. At each transition of the optical beam 56 between the perpendicular and parallel linear polarizations, the optical beam 56, and thus the reflected beam 68, drops to an approximate zero intensity. Therefore, the acceleration signals ACCEL can have a frequency corresponding to the transitions between the linear polarizations based on the intensity drop at each transition.

Figure 3:
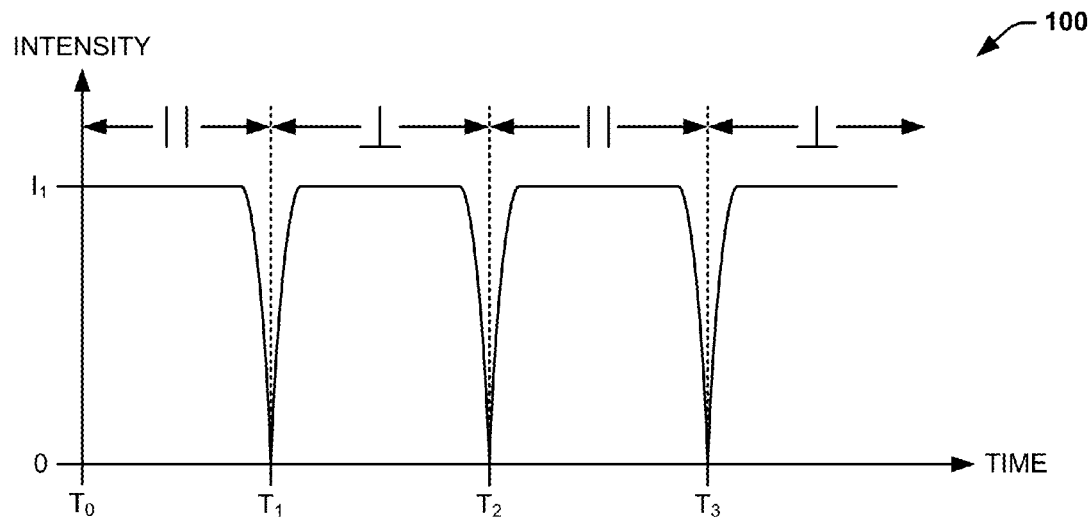
FIG. 3 illustrates an example of a timing diagram.

FIG. 3 illustrates an example of a timing diagram 100. The timing diagram 100 demonstrates an intensity profile of the reflected beam 68 over time, as measured by each of the photodetectors 54, and thus corresponding to the signals ACCEL. At a time $T_0$, the reflected beam 68 is provided to the photodetectors 54 at the parallel linear polarization at an intensity $I_1$, with the optical beam 56 being provided at the perpendicular polarization. Thus, during the time proceeding the time $T_0$, the reflected beam 68 stimulates the parallel stimulation axis of the gain medium of the VCSEL 52. As a result, at approximately a time $T_1$, the VCSEL 52 switches emission of the optical signal 56 from the perpendicular linear polarization to the parallel linear polarization. Therefore, the reflected beam 68 changes to the perpendicular linear polarization. At approximately the time $T_1$, the intensity of the reflected beam 68 drops to approximately zero as the VCSEL 52 switches emission of the optical beam 56 from the perpendicular linear polarization to the parallel linear polarization. Upon the emission of the optical beam 56 at the parallel linear polarization, the intensity of the reflected beam 68 increases back to approximately the intensity $I_1$.

At the time proceeding the time $T_1$, the reflected beam 68 stimulates the perpendicular stimulation axis of the gain medium of the VCSEL 52. As a result, at approximately a time $T_2$, the VCSEL 52 switches emission of the optical signal 56 from the parallel linear polarization to the perpendicular linear polarization. Therefore, the reflected beam 68 changes to the parallel linear polarization. At approximately the time $T_2$, the intensity of the reflected beam 68 drops to approximately zero as the VCSEL 52 switches emission of the optical beam 56 from the parallel linear polarization to the perpendicular linear polarization. Upon the emission of the optical beam 56 at the perpendicular linear polarization, the intensity of the reflected beam 68 increases back to approximately the intensity $I_1$.

The oscillation of the reflected beam between the linear polarizations continues thereafter. In the example of FIG. 3, the optical beam 56 switches from being emitted at the perpendicular linear polarization to the parallel linear polarization at approximately a time $T_3$. As a result, the reflected beam 68 switches from the parallel linear polarization to the perpendicular linear polarization at approximately the time $T_3$. Therefore, at approximately the time $T_3$, the intensity of the reflected beam 68 drops to approximately zero. Accordingly, the acceleration signals ACCEL each have a frequency that is based on the oscillation of the reflected beam 68 between the linear polarizations. The accelerometer system 10 can therefore be calibrated such that a known stable frequency corresponds to a steady-state (i.e., absent an external acceleration).

Referring back to the example of FIG. 2, as described previously, the mounting of the mirror 60 to the accelerometer housing 62 via the spring 64 can result in movement of the mirror 60 relative to the accelerometer housing 62, such as in response to an external acceleration acting upon the accelerometer housing 62. In the example of FIG. 2, an external acceleration of the accelerometer housing 62 in the +Y direction results in a relative motion of the mirror 60 in the −Y direction. As a result, the length of the optical cavity 66 decreases, such that the time that the optical beam 56 and the reflected beam 68 each respectively traverse the optical cavity 66 decreases. Accordingly, the frequency of the oscillations between the linear polarizations of the reflected beam 68, and thus the frequency of the acceleration signals ACCEL, increases. Similarly, an external acceleration of the accelerometer housing 62 in the −Y direction results in a relative motion of the mirror 60 in the +Y direction. As a result, the length of the optical cavity 66 increases, such that the time that the optical beam 56 and the reflected beam 68 each respectively traverse the optical cavity 66 increases. Accordingly, the frequency of the oscillations between the linear polarizations of the reflected beam 68, and thus the frequency of the acceleration signals ACCEL, decreases. The amount of increase and decrease of the acceleration signals ACCEL can be directly proportional to the magnitude of the external acceleration. Accordingly, the change in frequency of the acceleration signals ACCEL can directly correspond to the magnitude of the external acceleration.

In addition, because the acceleration signals $ACCEL_1$ and $ACCEL_2$ are independently generated by the respective photodetectors 54, the acceleration signals $ACCEL_1$ and $ACCEL_2$ can indicate the magnitude of the external acceleration even in the presence of a vector component of the external acceleration in at least one of the X- and Z-axes. For example, an external acceleration in the +X direction can result in motion of the mirror 60 in the −X direction. As a result, the reflected beam 68 can be provided to a greater surface area of the photodetector 54 that generates the acceleration signal $ACCEL_1$ than the photodetector 54 that generates the acceleration signal $ACCEL_2$. The use of the multiple photodetectors 54 can thus provide for a more robust accelerometer system 10, such that the vector components of the external acceleration do not have a deleterious impact on the operation of the accelerometer system 10.

The accelerometer system 50 can thus calculate the magnitude of the external acceleration based on the frequency of the acceleration signals ACCEL. Accordingly, the accelerometer system 10 can be substantially immune to damage resulting from excessive acceleration inputs that can result in changes in the bias and scale-factor requiring additional calibration of the accelerometer, as can be the case with pendulous electrostatic force-balanced accelerometer systems. In addition, because the external acceleration is calculated as a function of frequency, which can be very accurately calculated (e.g., based on use of an atomic clock), the accelerometer system 50 can calculate the acceleration in a very precise manner, and is not subject to a number of noise sources present in typical electrostatic force-balanced accelerometers.

It is to be understood that the optical accelerometer detection system 50 is not intended to be limited to the example of FIG. 2. For example, the manner in which the mirror 60 is mounted to the accelerometer housing 62 via the spring 64 is not limited to that demonstrated in the example of FIG. 2, but could be accomplished in a variety of different ways (e.g., flexures at the periphery of the mirror 60). In addition, while the example of FIG. 2 demonstrates two photodetectors 54, it is to be understood that the optical accelerometer detection system 50 could instead include a single photodetector 54, or more than two photodetectors 54. Therefore, the optical accelerometer detection system 50 can be configured in any of a variety of ways.

Figure 4:
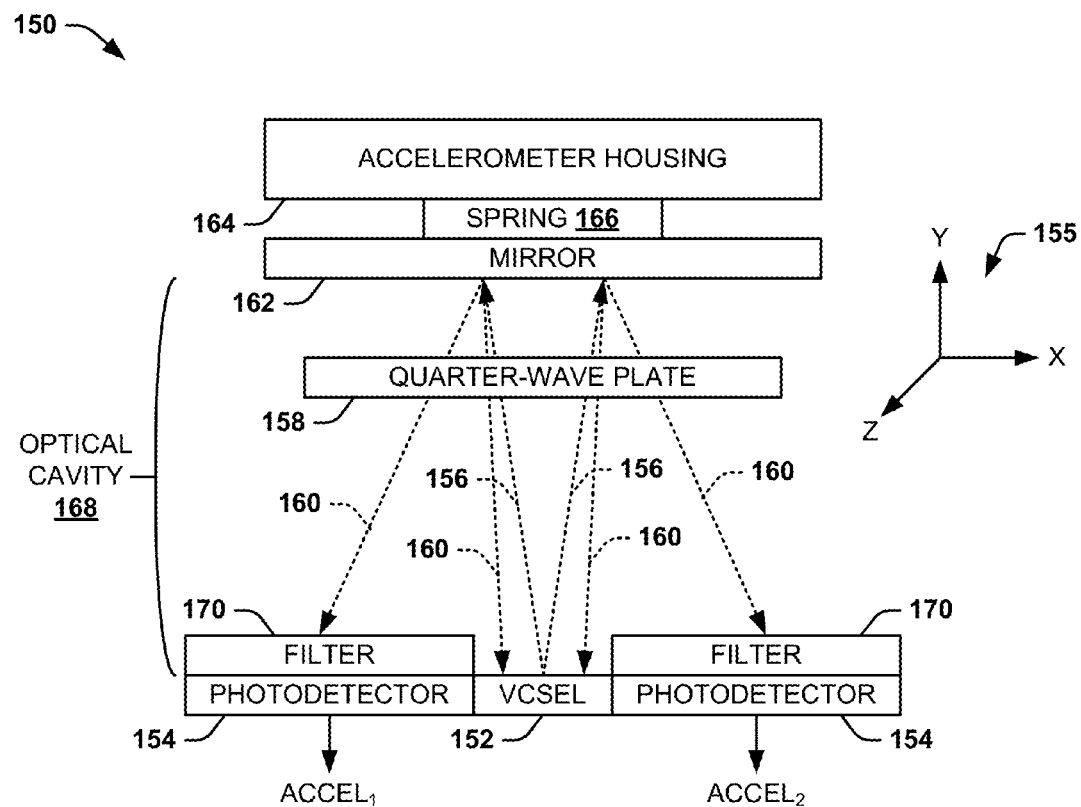
FIG. 4 illustrates another example of an optical accelerometer detection system.

FIG. 4 illustrates another example of an optical accelerometer detection system 150. The optical accelerometer detection system 150 can correspond to the optical accelerometer detection system 12 in the example of FIG. 1. Therefore, reference is to be made to the example of FIG. 1 in the following description of the example of FIG. 4.

The optical accelerometer detection system 150 is configured substantially similar to the optical accelerometer detection system 50 in the example of FIG. 2. In the example of FIG. 4, the optical accelerometer detection system 150 includes a VCSEL 152 that is arranged substantially coplanar with a plurality of photodetectors 154. The VCSEL 152 is configured to emit an optical beam 156 from an aperture in approximately the direction of the Y-axis according to a Cartesian coordinate system 155, with the optical beam 156 oscillating between linear polarizations, in the manner described previously in the example of FIG. 2. Specifically, the optical accelerometer detection system 150 includes a quarter-wave plate 158 that converts the linear polarization of the optical beam 156 to the orthogonal linear polarization in a reflected beam 160. The optical accelerometer detection system 150 further includes a mirror 162 that is mounted to an accelerometer housing 164 by a spring 166, with the distance along the Y-axis between the VCSEL 152 and the mirror 162 defining an optical cavity 168.

In addition, the optical accelerometer detection system 150 includes polarization filters 170 overlaying the photodetectors 154. As an example, the polarization filters 170 can be configured to filter a specific linear polarization, such that the photodetectors 154 can be prevented from receiving the reflected beam 160 when the reflected beam 160 is being provided at that specific linear polarization. Therefore, the acceleration signals ACCEL can have a magnitude of approximately zero during the time when the reflected beam 160 is being provided at that specific linear polarization.

Figure 5:
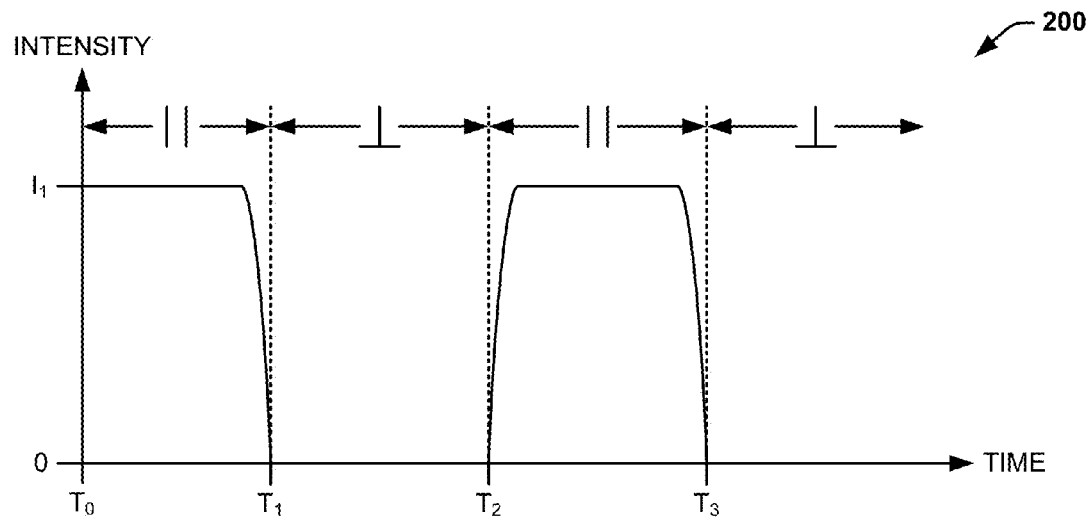
FIG. 5 illustrates another example of a timing diagram.

FIG. 5 illustrates another example of a timing diagram 200. The timing diagram 200 demonstrates an intensity profile of the reflected beam 160 over time, as measured by each of the photodetectors 154, and thus corresponding to the signals ACCEL. As an example, the polarization filters 170 can be configured to filter the perpendicular linear polarization. At a time $T_0$, the reflected beam 160 is provided to the photodetectors 154 at the parallel linear polarization at an intensity $I_1$, with the optical beam 156 being provided at the perpendicular polarization. Thus, during the time proceeding the time $T_0$, the reflected beam 160 stimulates the parallel stimulation axis of the gain medium of the VCSEL 152. As a result, at approximately a time $T_1$, the VCSEL 152 switches emission of the optical signal 156 from the perpendicular linear polarization to the parallel linear polarization. Therefore, the reflected beam 160 changes to the perpendicular linear polarization. At approximately the time $T_1$, the intensity of the reflected beam 160 drops to approximately zero as the VCSEL 152 switches emission of the optical beam 156 from the perpendicular linear polarization to the parallel linear polarization. However, because of the polarization filters 170 filtering the perpendicular linear polarization of the reflected beam 160, the intensity of the reflected beam 160 as measured by the photodetectors 154 remains at approximately zero.

At the time proceeding the time $T_1$, the reflected beam 160 stimulates the perpendicular stimulation axis of the gain medium of the VCSEL 152. As a result, at approximately a time $T_2$, the VCSEL 152 switches emission of the optical signal 156 from the parallel linear polarization to the perpendicular linear polarization. Therefore, the reflected beam 160 changes to the parallel linear polarization. Upon the emission of the optical beam 156 at the perpendicular linear polarization, and thus the reflected beam 160 being provided at the parallel linear polarization, the intensity of the reflected beam 160 as measured by the photodetectors 154 increases back to approximately the intensity $I_1$.

The oscillation of the reflected beam between the linear polarizations continues thereafter. In the example of FIG. 5, the optical beam 156 switches from being emitted at the perpendicular linear polarization to the parallel linear polarization at approximately a time $T_3$. As a result, the reflected beam 160 switches from the parallel linear polarization to the perpendicular linear polarization at approximately the time $T_3$. Therefore, at approximately the time $T_3$, the intensity of the reflected beam 160 drops to approximately zero as measured by the photodetectors 154 and remains at approximately zero until the optical beam 156 is again provided with the perpendicular linear polarization. Accordingly, similar to as described previously, the acceleration signals ACCEL each have a frequency that is based on the oscillation of the reflected beam 160 between the linear polarizations. However, in the example of FIGS. 4 and 5, the frequency of the acceleration signals ACCEL can be more easily measured based on the change in intensity between zero and the intensity $I_1$ through every other linear polarization change.

Figure 6:
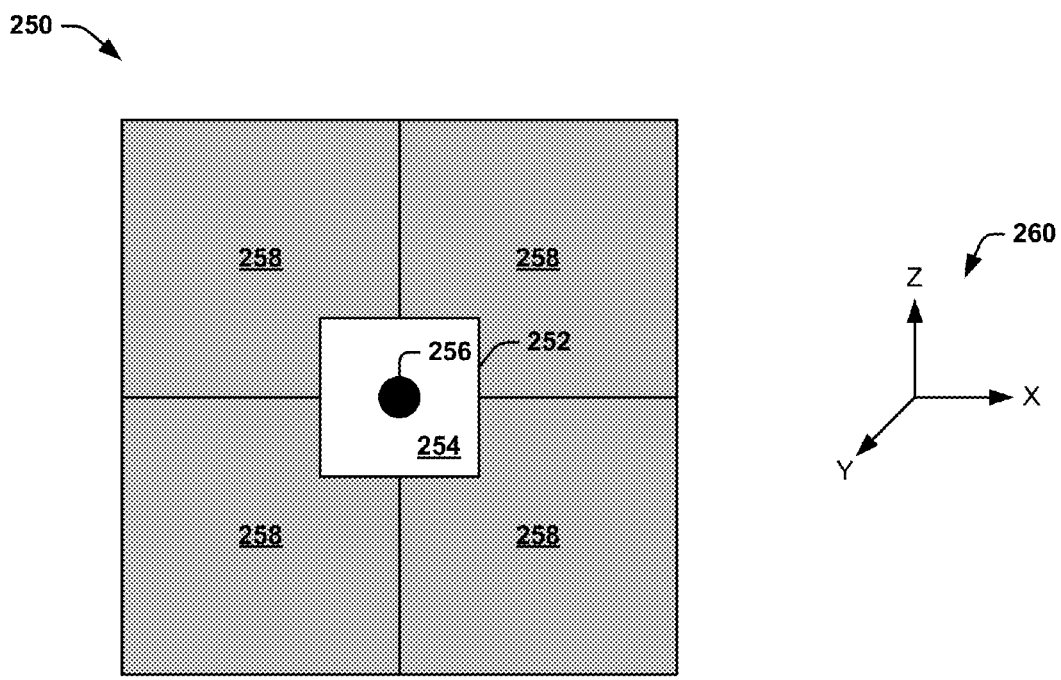
FIG. 6 illustrates an example of a top-view of an optical acceleration detection system.

FIG. 6 illustrates an example of a top-view of an optical acceleration detection system 250. The optical acceleration detection system 250 can correspond to the optical acceleration detection system 50 in the example of FIG. 2 or the optical acceleration detection system 150 in the example of FIG. 4. The optical acceleration detection system 250 includes a VCSEL 252 that includes a substrate 254 and a gain medium with aperture 256. The optical acceleration detection system 250 also includes a plurality of photodetectors 258 that substantially surround the VCSEL 252 in an X-Y plane, as demonstrated based on a Cartesian coordinate system 260.

In the example of FIG. 6, the VCSEL 252 is configured to emit an optical beam in the +Y direction from the aperture 256. The optical beam can thus be reflected back via a spring-mounted mirror to be received as a reflected beam having an orthogonal polarization by the gain medium 256 and the photodetectors 258. Therefore, based on the orthogonal polarization of the reflected beam received at the gain medium 256, the optical beam can oscillate between the orthogonal linear polarizations, as described previously. In addition, the photodetectors 258 can each be configured to separately generate acceleration signals having a frequency that corresponds to external acceleration of the accelerometer housing in which the optical acceleration detection system 250 can be included.

In addition, because the photodetectors 258 each generate acceleration signals independently, the acceleration signals can indicate the magnitude of the external acceleration even in the presence of a vector component of the external acceleration in at least one of the X- and Z-axes. For example, an external acceleration in the +X direction can result in motion of the respective mirror in the −X direction. As a result, the reflected beam can be provided to a greater surface area of the leftmost photodetectors 258 in the example of FIG. 6 than the rightmost photodetectors 258. Therefore, the optical accelerometer system in which the optical accelerometer detection system 250 is included can be operated in a robust manner, such that the vector components of the external acceleration do not have a deleterious impact on the operation of the associated optical accelerometer system.

Figure 7:
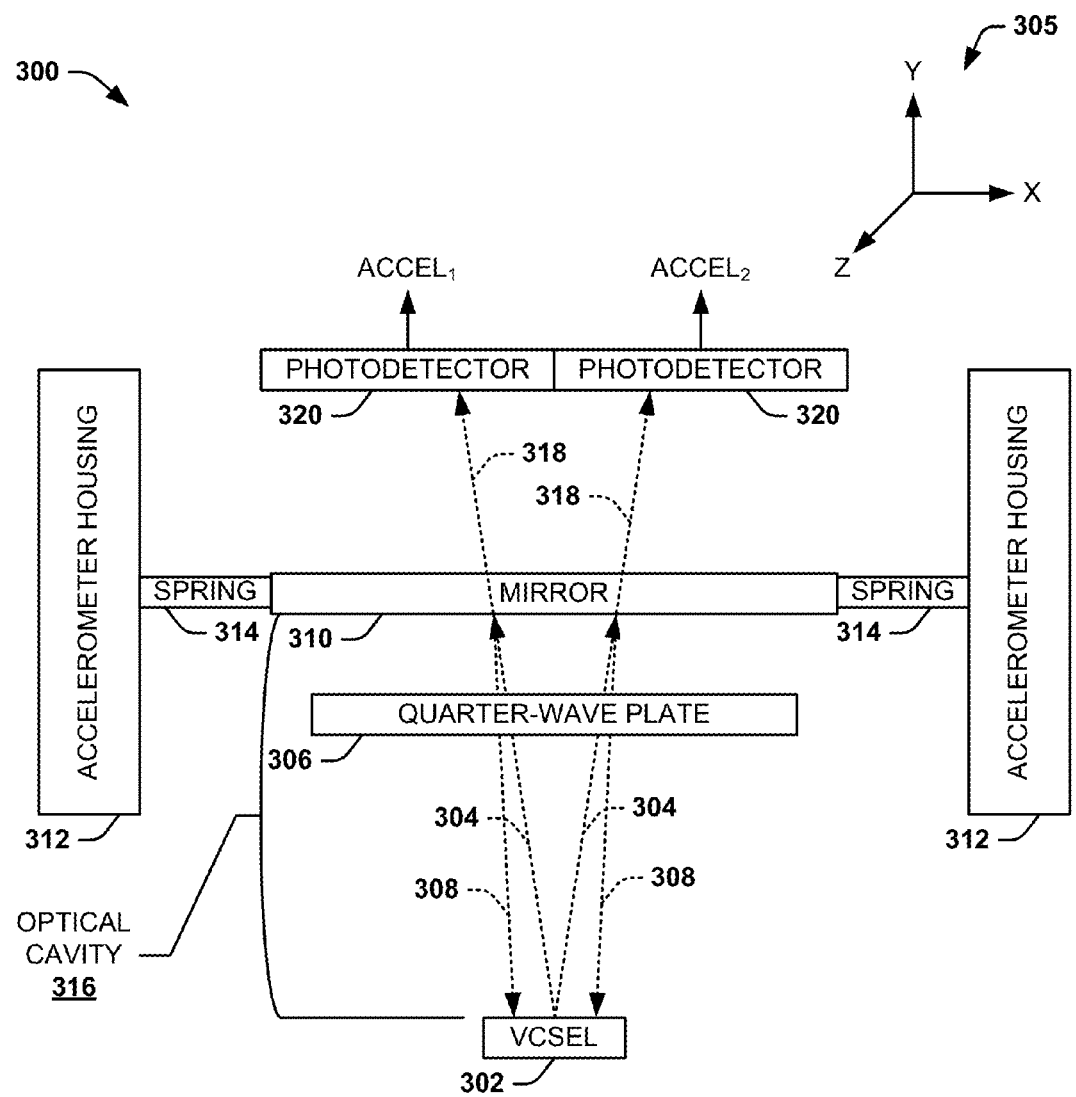
FIG. 7 illustrates yet another example of an optical accelerometer detection system.

FIG. 7 illustrates yet another example of an optical accelerometer detection system 300. The optical accelerometer detection system 300 can correspond to the optical accelerometer detection system 12 in the example of FIG. 1. Therefore, reference is to be made to the example of FIG. 1 in the following description of the example of FIG. 7.

The optical accelerometer detection system 300 is configured similar to the optical accelerometer detection system 50 in the example of FIG. 2. In the example of FIG. 7, the optical accelerometer detection system 300 includes a VCSEL 302 that is configured to emit an optical beam 304 from an aperture in approximately the direction of the Y-axis according to a Cartesian coordinate system 305, with the optical beam 304 oscillating between linear polarizations, in the manner described previously in the example of FIG. 2. Specifically, the optical accelerometer detection system 300 includes a quarter-wave plate 306 that converts the linear polarization of the optical beam 304 to the orthogonal linear polarization in a reflected beam 308. The optical accelerometer detection system 300 further includes a partially-silvered mirror 310 that is mounted to an accelerometer housing 312 by springs 314, with the distance along the Y-axis between the VCSEL 302 and the partially-silvered mirror 310 defining an optical cavity 316.

Because the mirror 310 is partially-silvered, the partially-silvered mirror 310 is also configured to pass a portion of the optical beam 304 through the partially-silvered mirror 310 as a transmissive beam 318. The transmissive beam 318 is provided to a plurality of photodetectors 320 that are each configured to monitor an intensity of the transmissive beam 318 and to generate acceleration signals ACCEL, demonstrated in the example of FIG. 7 as accelerations signals $ACCEL_1$ and $ACCEL_2$, similar to as described previously in the examples of FIGS. 2 and 4. Thus, the accelerations signals $ACCEL_1$ and $ACCEL_2$ can have a frequency corresponding to the oscillation of the linear polarizations of the VCSEL 302 based on the orthogonal linear polarization of the reflected beam 308 relative to the optical beam 304. In addition, because the partially-silvered mirror 310 is mounted to the accelerometer housing 312 by the springs 314, the partially-silvered mirror 310 can move independently of the accelerometer housing 312 in response to an external acceleration. Therefore, the frequency of the accelerations signals $ACCEL_1$ and $ACCEL_2$ can change in response to an external acceleration, similar to as described previously in the examples of FIGS. 2 and 4.

The optical accelerometer detection system 300 can thus have an intensity profile of the transmissive beam 318 that resembles the reflected beam 68 in the example of FIG. 2, such as demonstrated by the timing diagram 100 in the example of FIG. 3. However, it is to be understood that the optical accelerometer detection system 300 can also include polarization filters, similar to the optical accelerometer detection system 150 in the example of FIG. 4. For example, the optical accelerometer detection system 300 could further include an additional quarter-wave plate between the partially-silvered mirror 310 and the photodetectors 320 to convert the circularly-polarized transmissive beam 318 to a linear polarization. The optical accelerometer detection system 300 could thus also include polarization filters that occlude the photodetectors 320, such as to block one of the perpendicular and parallel linear polarizations from being provided to the photodetectors 320. Accordingly, the optical accelerometer detection system 300 could instead be configured to have an intensity profile of the transmissive beam 320, as received by the photodetectors 320, that is substantially similar to the intensity profile demonstrated by the timing diagram 200 in the example of FIG. 5.

Figure 8:
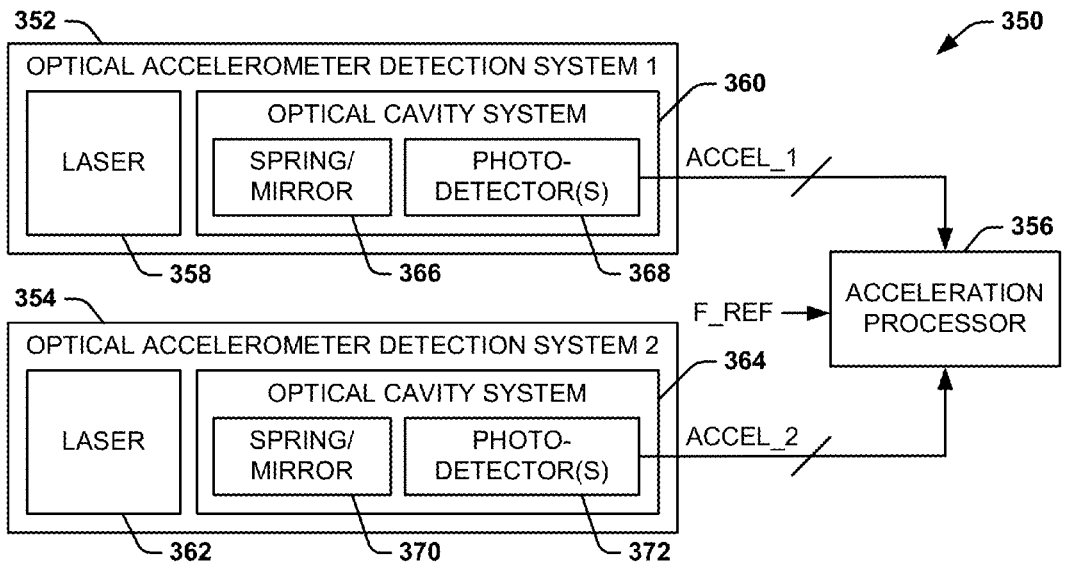
FIG. 8 illustrates another example of an optical accelerometer system.

FIG. 8 illustrates another example of an optical accelerometer system 350. The optical accelerometer system 350 includes a first optical accelerometer detection system 352, a second optical acceleration system 354, and an acceleration processor 356. As an example, the first and second optical accelerometer detection systems 352 and 354 can be configured similarly with regard to components and dimensions, and can each be configured substantially similar to one of the optical accelerometer detection systems 50, 150, and 300 in the examples of FIGS. 2, 4, and 7. Thus, the first optical accelerometer detection system 352 includes a laser 358 and an optical cavity system 360, and the second optical accelerometer detection system 354 includes a laser 362 and an optical cavity system 364. The optical accelerometer detection systems 352 and 354 are thus configured to detect motion resulting from an external force that is applied to an accelerometer housing to which the optical accelerometer detection systems 352 and 354 are physically coupled. The lasers 358 and 362 can each be configured, for example, as VCSELs, such as including a gain medium that includes perpendicular stimulation axes. The lasers 358 and 362 are each configured to generate an optical beam that alternates between linear polarizations, as described previously.

In the example of FIG. 8, the first optical cavity system 360 includes a spring-mounted mirror 366 and one or more photodetectors 368 and the second optical cavity system 364 includes a spring-mounted mirror 370 and one or more photodetectors 372. The mirrors 366 and 370 can be mounted to an accelerometer housing via respective springs, such that the mirrors 366 and 370 can move relative to the accelerometer housing in response to an external acceleration of the accelerometer housing, such as in response to an external force. The mirrors 366 and 370 are configured to reflect the optical beam emitted from the respective lasers 358 and 362 toward the respective photodetector(s) 368 and 372 to be received at the respective photodetector(s) 368 and 372 at the opposite polarization of that which is emitted from the respective lasers 358 and 362 (e.g., the parallel or the perpendicular polarization). The mirrors 366 and 370 can also reflect the respective optical beams back to the respective lasers 358 and 362 to cause the lasers 356 and 362 to periodically oscillate between emission of one of the parallel and perpendicular polarization and emission of the other of the parallel and perpendicular polarization, as described previously.

The photodetector(s) 368 and 372 can thus be configured to measure an intensity of the respective reflected or transmissive optical beams and to generate respective acceleration signals ACCEL_1 and ACCEL_2. As an example, the respective acceleration signal(s) ACCEL_1 and ACCEL_2 can each have a frequency that corresponds to the periodic oscillation between the emission of the parallel and perpendicular polarizations from the respective lasers 358 and 362. The frequencies of the acceleration signal(s) ACCEL_1 and ACCEL_2 can thus each vary in response to motion of the respective mirrors 366 and 370 relative to the accelerometer housing in response to the external acceleration. Therefore, the respective acceleration signal(s) ACCEL_1 and ACCEL_2 can be indicative of the presence of the external acceleration.

In the example of FIG. 8, the springs that couple the mirror 366 and the mirror 370 can have different associated spring constants, such that the mirrors 366 and 370 move differently in response to the external acceleration. Therefore, an effective cavity length of each of the optical cavity systems 360 and 364 will be different in response to the external acceleration based on the unequal spring constants of springs of the mirrors 366 and 370. For example, a change in the cavity length of a given one of the optical cavity systems 360 and 364 is a function of temperature and the associated spring constant of the springs of the mirrors 366 and 370. Therefore, the acceleration processor 356 can be configured to calculate the magnitude of the external acceleration based on a ratio of the frequencies of the acceleration signals ACCEL_1 and ACCEL_2, based on temperature, and based on a predetermined reference frequency F_REF. As an example, the acceleration processor 356 can implement the following equation to calculate a ratio of a frequency $F_1$ associated with the acceleration signal ACCEL_1 and a frequency $F_2$ associated with the acceleration signal ACCEL_2:

$$\frac{\dfrac{L_{0,2} + L_{0,2} * \Delta T * dL/dT + m_2 * a}{K_{0,2} + \Delta T * dK/dT}}{\dfrac{L_{0,1} + L_{0,1} * \Delta T * dL/dT + m_1 * a}{K_{0,1} + \Delta T * dK/dT}} = \frac{F_1}{F_2} \qquad \text{Equation 1}$$

Where:
$L_{0,1}$ and $L_{0,2}$ are initial (e.g., at rest) cavity lengths of the respective optical cavity systems 360 and 364;
$\Delta T$ is a change in temperature;
$K_{0,1}$ and $K_{0,2}$ are respective spring constants associated with the mirrors 366 and 370;
$m_1$ and $m_2$ are respective masses associated with the mirrors 366 and 370;
dL/dT is an average temperature derivative of cavity length from an initial temperature T to a temperature T+$\Delta T$; and
dK/dT is an average temperature derivative of spring constant from the initial temperature T to the temperature T+$\Delta T$.

Therefore, based on comparing the ratio of the frequencies $F_1$ and $F_2$, each measured using the predetermined reference frequency F_REF, the acceleration processor 354 can be configured to calculate a magnitude of external acceleration in at least one dimension. For example, the respective coefficients of Equation 1 and the output of the acceleration processor 354 can be calibrated for temperature using, for example, a standard temperature-controlled +/−1 g tumble calibration measurement over a given temperature range (e.g., between −55° C. and 85° C.). Therefore, the calibration can result in substantially stable and repeatable calculations of the external acceleration, regardless of changes to the properties of the materials of the optical accelerometer system 350 and to the predetermined reference frequency F_REF over temperature. As a result, the optical accelerometer system 350 can implement a less stable, and thus less expensive, frequency reference that generates the predetermined reference frequency F_REF and still achieve stable and repeatable calculations of the external acceleration over temperature variations.

Figure 9:
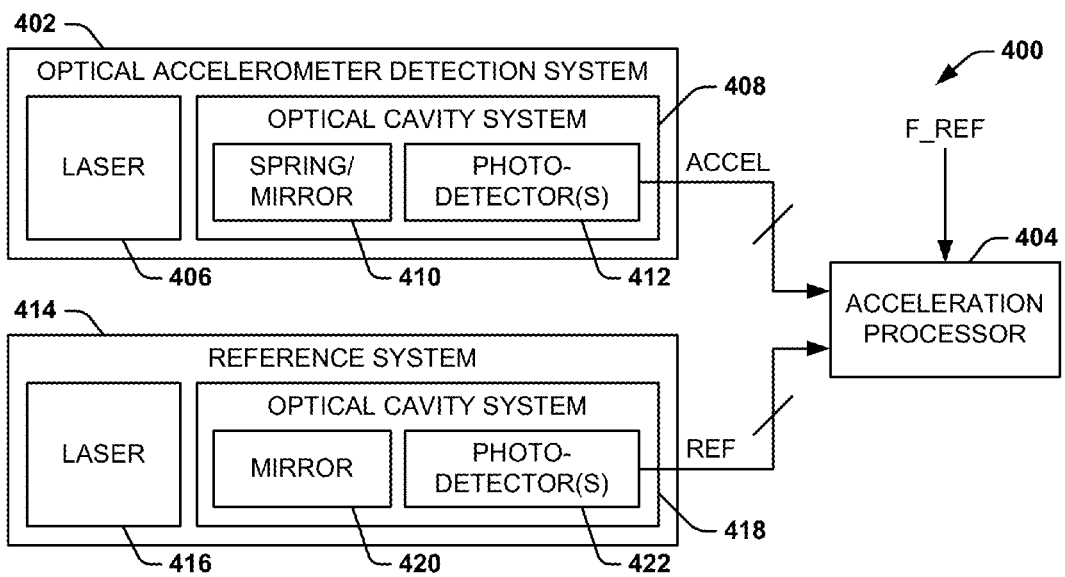
FIG. 9 illustrates yet another example of an optical accelerometer system.

FIG. 9 illustrates yet another example of an optical accelerometer system 400. The optical accelerometer system 400 is another example of an optical accelerometer system 400 that can be configured to calculate an external acceleration in a manner that is substantially temperature independent. The optical accelerometer system 400 includes an optical accelerometer detection system 402 and an acceleration processor 404. As an example, the optical accelerometer detection system 402 can be configured substantially similar to one of the optical accelerometer detection systems 50, 150, and 400 in the examples of FIGS. 2, 4, and 7. Thus, the optical accelerometer detection system 402 includes a laser 406 and an optical cavity system 408 configured to detect motion resulting from an external force that is applied to an accelerometer housing to which the optical accelerometer detection system 402 is physically coupled. The laser 406 can be configured, for example, as a VCSEL, such as including a gain medium that includes perpendicular stimulation axes. The laser 406 is configured to generate an optical beam that alternates between linear polarizations, as described previously.

In the example of FIG. 9, the optical cavity system 408 includes a spring-mounted mirror 410 and one or more photodetectors 412. The mirror 410 can be mounted to an accelerometer housing via a spring, such that the mirror 410 can move relative to the accelerometer housing in response to an external acceleration of the accelerometer housing, such as in response to an external force. The mirror 410 is configured to reflect the optical beam emitted from the laser 406 toward the photodetector(s) 412 to be received at the photodetector(s) 412 at the opposite polarization of that which is emitted from the laser 406 (e.g., the parallel or the perpendicular polarization). The mirror 410 can also reflect the optical beam back to the laser 406 to cause the laser 406 to periodically oscillate between emission of one of the parallel and perpendicular polarization and emission of the other of the parallel and perpendicular polarization, as described previously.

The photodetector(s) 412 can thus be configured to measure an intensity of the reflected optical beam and to generate a respective at least one acceleration signal ACCEL. As an example, the acceleration signal(s) ACCEL can have a frequency that corresponds to the periodic oscillation between the emission of the parallel and perpendicular polarizations from the laser 406. The frequency of the acceleration signal(s) ACCEL can thus vary in response to motion of the mirror 410 relative to the accelerometer housing in response to the external acceleration. Therefore, the acceleration signal(s) ACCEL can be indicative of the presence of the external acceleration. The acceleration signal ACCEL is provided to the acceleration processor 404 that is configured to calculate the magnitude of the external acceleration based on the frequency of the signal ACCEL. For example, the acceleration processor 404 can compare the frequency of the acceleration signal ACCEL with a predetermined reference frequency F_REF. Therefore, the accelerometer system 400 can be configured to calculate a magnitude of external acceleration in at least one dimension based on the acceleration processor 404.

In the example of FIG. 9, the optical accelerometer system 400 further includes a reference system 414. The reference system 414 can be configured similar to the optical accelerometer detection system 402. Specifically, the reference system 414 includes a laser 416 and an optical cavity system 418. The laser 416 can be configured, for example, as a VCSEL, such as including a gain medium that includes perpendicular stimulation axes, such that the laser 416 is configured to generate an optical beam that alternates between linear polarizations, as described previously. The optical cavity system 418 includes a mirror 420 and one or more photodetectors 422. As an example, the mirror 420 could be fully reflective, such as the mirrors 60 and 162 in the examples of FIGS. 2 and 4, respectively, or could be partially-silvered, such as the mirror 310 in the example of FIG. 7. The photodetector(s) 422 are configured to generate a respective one or more reference signals REF having a frequency corresponding to the oscillation of the optical beam between the two orthogonal linear polarizations, similar to the acceleration signal(s) ACCEL, as described previously.

As opposed to the optical accelerometer detection system 402, the mirror 420 in the reference system 414 is not mounted to the accelerometer housing via a spring. Therefore, the mirror 420 does not move relative to the accelerometer housing in response to an external acceleration. As an example, the reference system 414 and the optical accelerometer detection system 402 can be fabricated as process-matched components. Therefore, the reference system 414 can be configured to provide the reference signals REF as a frequency reference to the acceleration processor 404. The frequency reference of the reference signal(s) REF can provide an indication of a steady state frequency of the acceleration signal(s) ACCEL, such as can be implemented to substantially cancel temperature induced frequency variations which would result in bias errors in the acceleration signal(s) ACCEL. Additionally, the frequency reference of the reference signals REF can provide a highly stable and repeatable indication of the temperature of the optical accelerometer detection system 402, allowing highly accurate and repeatable modeling of the change in scale factor of optical accelerometer detection system 402 as a function of temperature. Therefore, the acceleration processor 404 can calculate the magnitude of the external acceleration substantially absent errors resulting from temperature variations that can cause changes to the frequency of the acceleration signal(s) ACCEL.

Referring back to the example of FIG. 1, as described previously, an optical accelerometer system 10 can include more than one laser 16 in the optical accelerometer detection system 12. For example, the optical accelerometer detection system 12 can implement two opposing lasers, such that the acceleration processor 14 can calculate the magnitude of the external acceleration in a manner that is substantially temperature independent and substantially independent of the predetermined reference frequency F_REF.

Figure 10:
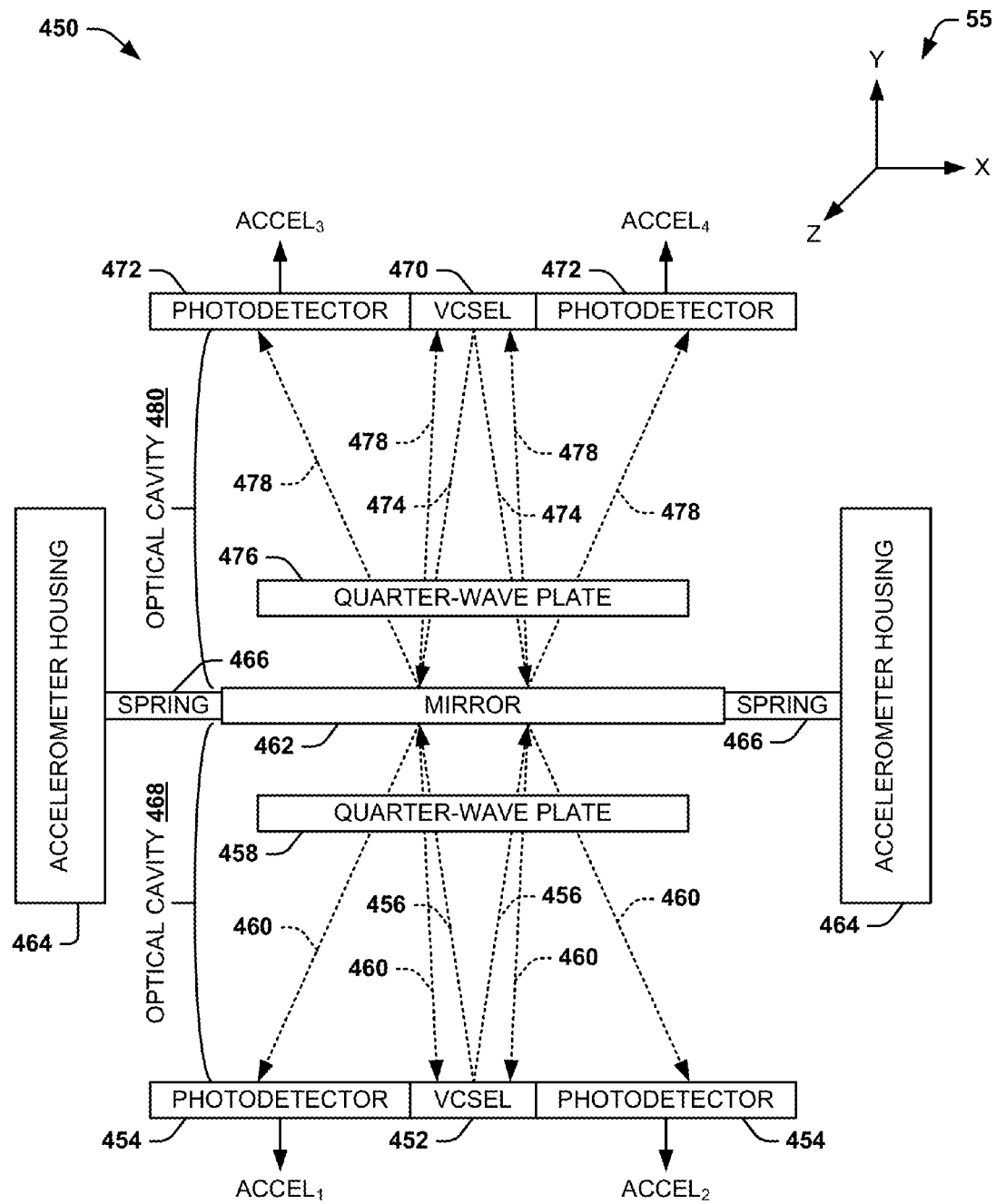
FIG. 10 illustrates yet a further example of an optical accelerometer detection system.

FIG. 10 illustrates yet a further example of an optical accelerometer detection system 450. The optical accelerometer detection system 450 can correspond to the optical accelerometer detection system 12 in the example of FIG. 1. Therefore, reference is to be made to the example of FIG. 1 in the following description of the example of FIG. 10.

The optical accelerometer detection system 450 includes a first VCSEL 452 that is arranged substantially coplanar with a first plurality of photodetectors 454. As an example, the optical accelerometer detection system 450 can include polarization filters over the photodetectors 454, similar to as described previously in the examples of FIGS. 4 and 5. The first VCSEL 452 is configured to emit a first optical beam 456 from an aperture in approximately the direction of the Y-axis according to a Cartesian coordinate system 455, with the first optical beam 456 oscillating between linear polarizations, in the manner described previously in the example of FIG. 2. Specifically, the optical accelerometer detection system 450 also includes a quarter-wave plate 458 that converts the linear polarization of the first optical beam 456 to the orthogonal linear polarization in a first reflected beam 460. The optical accelerometer detection system 450 further includes a mirror 462 that reflects the first optical beam 456 from a first surface to provide the reflected beam 460. The mirror 462 is mounted to an accelerometer housing 464 by springs 466, with the distance along the Y-axis between the first VCSEL 452 and the mirror 462 defining a first optical cavity 468.

The optical accelerometer detection system 450 includes a second VCSEL 470 that is arranged substantially coplanar with a second plurality of photodetectors 472. As an example, the optical accelerometer detection system 450 can include polarization filters over the photodetectors 472, similar to as described previously in the examples of FIGS. 4 and 5. The second VCSEL 470 is configured to emit a second optical beam 474 from an aperture in approximately the direction of the −Y-axis, with the second optical beam 454 oscillating between linear polarizations, similar to the first optical beam 456. Specifically, the optical accelerometer detection system 450 also includes a quarter-wave plate 476 that converts the linear polarization of the second optical beam 474 to the orthogonal linear polarization in a second reflected beam 478. In the example of FIG. 10, the mirror 462 reflects the second optical beam 456 from a second surface to provide the reflected beam 478. The distance along the Y-axis between the second VCSEL 470 and the mirror 462 defines a second optical cavity 480.

Similar to as described previously, the mounting of the mirror 462 to the accelerometer housing 464 via the springs 466 can result in movement of the mirror 462 relative to the accelerometer housing 464 in response to the external acceleration. In the example of FIG. 10, an external acceleration of the accelerometer housing 464 in the +Y direction results in a relative motion of the mirror 462 in the −Y direction, such that the length of the first optical cavity 468 decreases and the length of the second optical cavity 480 increases. Thus, the time that the first optical beam 456 and the first reflected beam 460 each respectively traverse the first optical cavity 468 decreases and the time that the second optical beam 474 and the second reflected beam 478 each respectively traverse the second optical cavity 480 increases. Accordingly, the frequency of the oscillations between the linear polarizations of the first reflected beam 460, and thus the frequency of acceleration signals $ACCEL_1$ and $ACCEL_2$ generated by the first photodetectors 454, increases. Similarly, the frequency of the oscillations between the linear polarizations of the second reflected beam 478, and thus the frequency of acceleration signals $ACCEL_3$ and $ACCEL_4$ generated by the second photodetectors 472, decreases. Similarly, an external acceleration of the accelerometer housing 464 in the −Y direction results in a relative motion of the mirror 462 in the +Y direction, thus resulting in a decrease of the frequency of the acceleration signals $ACCEL_1$ and $ACCEL_2$ and an increase of the frequency of the acceleration signals $ACCEL_3$ and $ACCEL_4$.

The respective amount of increase and decrease of the acceleration signals $ACCEL_1$ and $ACCEL_2$ and the acceleration signals $ACCEL_3$ and $ACCEL_4$ can be directly proportional to the magnitude of the external acceleration. Accordingly, the change in frequency of the acceleration signals ACCEL can directly correspond to the magnitude of the external acceleration. However, regardless of the external acceleration acting upon the accelerometer housing 464, a sum of the acceleration signals $ACCEL_1$ and $ACCEL_2$ and the acceleration signals $ACCEL_3$ and $ACCEL_4$ remains substantially equal. Therefore, the sum of the acceleration signals $ACCEL_1$ and $ACCEL_2$ and the acceleration signals $ACCEL_3$ and $ACCEL_4$ can be implemented as a frequency reference, such that a difference between the acceleration signals $ACCEL_1$ and $ACCEL_2$ and the acceleration signals $ACCEL_3$ and $ACCEL_4$ can be implemented as a measure of the external acceleration relative to the sum.

Because the sum of the acceleration signals $ACCEL_1$ and $ACCEL_2$ and the acceleration signals $ACCEL_3$ and $ACCEL_4$ remains substantially equal and can be implemented as a reference frequency, the optical accelerometer detection system 450 can be implemented to calculate the external acceleration substantially independent of temperature variations. Specifically, as temperature variations affect the properties of the optical accelerometer detection system 450, corresponding variations of the frequency of the acceleration signals $ACCEL_1$ and $ACCEL_2$ and the acceleration signals $ACCEL_3$ and $ACCEL_4$ are substantially canceled based on the corresponding variations of the sum of the acceleration signals $ACCEL_1$ and $ACCEL_2$ and the acceleration signals $ACCEL_3$ and $ACCEL_4$. In addition, temperature variations that affect the optical cavity 468 in a manner differently than the optical cavity 480 are still substantially canceled, as the sum of the acceleration signals $ACCEL_1$ and $ACCEL_2$ and the acceleration signals $ACCEL_3$ and $ACCEL_4$ are correspondingly affected in a substantially equal manner. Furthermore, to the extent that the spring constants of the springs 466 provide for substantially linear displacement of the mirror 462 as a function of the external acceleration, a scale factor of the measured frequency difference per unit acceleration also remains substantially linear in the first order. Accordingly, the acceleration processor 14 can calculate the external acceleration in a manner that is substantially independent of temperature and without the use of an additional frequency reference to generate a predetermined reference frequency F_REF.

Figure 11:
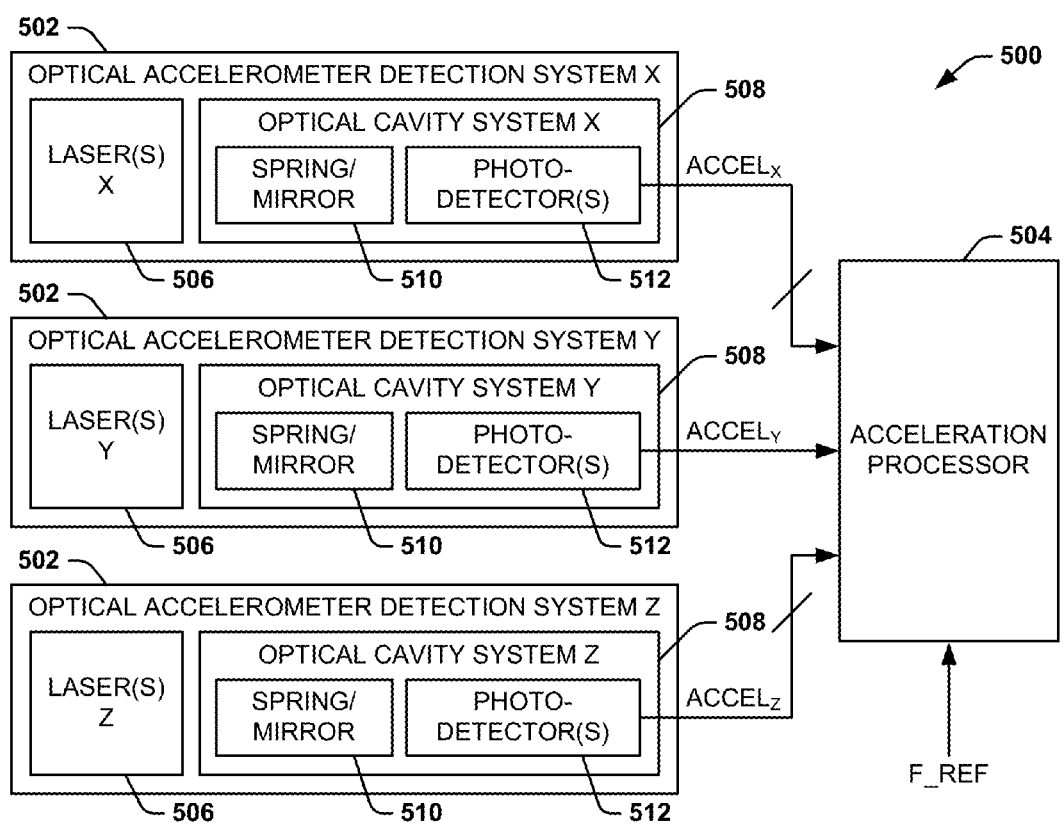
FIG. 11 illustrates an example of a three-axis optical accelerometer system.

FIG. 11 illustrates an example of a three-axis optical accelerometer system 500. The three-axis accelerometer system 500 can be implemented in any of a variety of applications, such as for navigation and/or guidance systems. Thus, the three-axis accelerometer system 500 can be configured to calculate an external acceleration acting upon the three-axis accelerometer system 500 in three orthogonal axes in Cartesian coordinate space.

The three-axis optical accelerometer system 500 includes a plurality of optical accelerometer detection systems 502 and an acceleration processor 504. In the example of FIG. 11, each of the optical accelerometer detection systems 502 are associated with a separate respective orthogonal axis in Cartesian coordinate space, and are thus labeled OPTICAL ACCELEROMETER DETECTION SYSTEM X, OPTICAL ACCELEROMETER DETECTION SYSTEM Y, and OPTICAL ACCELEROMETER DETECTION SYSTEM Z, respectively. As an example, each of the optical accelerometer detection systems 502 can be configured substantially similar to one of the optical accelerometer detection systems 50, 150, 300, and 450 in the respective examples of FIGS. 2, 4, 7, and 10, such as based on alignment of the optical cavity 66, 168, 308, 468, and 480 of each of the optical accelerometer detection systems 502 in the respective orthogonal axis. Thus, the optical accelerometer detection systems 502 each include one or more lasers 506 and an optical cavity system 508 configured to detect motion resulting from an external force that is applied to an accelerometer housing to which the respective optical accelerometer detection systems 502 are physically coupled in each of the three orthogonal axes. The laser(s) 506 can be configured, for example, as VCSELs, such as including a gain medium that includes perpendicular stimulation axes. The laser(s) 506 are configured to generate an optical beam that alternates between linear polarizations, as described previously. Each of these individual optical accelerometer detection systems 502 may include a reference system similar to the reference system 364 in the example of FIG. 9, each configured to provide a respective reference signal for each optical accelerometer detection system 502 in the example of FIG. 11.

In the example of FIG. 11, the optical cavity system 508 includes a spring-mounted mirror 510 and one or more photodetectors 512. The mirror 510 can be mounted to an accelerometer housing via a spring, such that the mirror 510 can move relative to the accelerometer housing in response to an external acceleration of the accelerometer housing, such as in response to an external force. The mirror 510 is configured to reflect the optical beam emitted from the laser(s) 506 toward the photodetector(s) 512 to be received at the photodetector(s) 512 at the opposite polarization of that which is emitted from the laser(s) 506 (e.g., the parallel or the perpendicular polarization). The mirror 510 can also reflect the optical beam back to the laser(s) 506 to cause the laser(s) 506 to periodically oscillate between emission of one of the parallel and perpendicular polarization and emission of the other of the parallel and perpendicular polarization, as described previously.

The photodetector(s) 512 can thus be configured to measure an intensity of the reflected optical beam and to generate a respective at least one acceleration signal ACCEL. In the example of FIG. 11, the optical accelerometer detection systems 502 are each configured to generate respective acceleration signal(s) $ACCEL_X$, $ACCEL_Y$, and $ACCEL_Z$ corresponding to respective motion in each of the three orthogonal axes. As an example, the acceleration signal(s) $ACCEL_X$, $ACCEL_Y$, and $ACCEL_Z$ can each have a frequency that corresponds to the periodic oscillation between the emission of the parallel and perpendicular polarizations from the laser(s) 506. The frequency of the acceleration signal(s) $ACCEL_X$, $ACCEL_Y$, and $ACCEL_Z$ can thus vary in response to vector components of motion of the mirror 510 relative to the accelerometer housing in response to the external acceleration in the respective three orthogonal axes. Therefore, the acceleration signal(s) $ACCEL_X$, $ACCEL_Y$, and $ACCEL_Z$ can be indicative of the presence of the external acceleration in three dimensions. The acceleration signals $ACCEL_X$, $ACCEL_Y$, and $ACCEL_Z$ are provided to the acceleration processor 504 that is configured to calculate the magnitude of the external acceleration in three dimensions based on the respective frequencies of the acceleration signals $ACCEL_X$, $ACCEL_Y$, and $ACCEL_Z$. For example, the acceleration processor 14 can compare the frequency of the acceleration signals $ACCEL_X$, $ACCEL_Y$, and $ACCEL_Z$ with a predetermined reference frequency F_REF. Therefore, the three-axis optical accelerometer system 500 can be configured to calculate a magnitude of external acceleration in three dimensions based on the acceleration processor 504.

Figure 12:
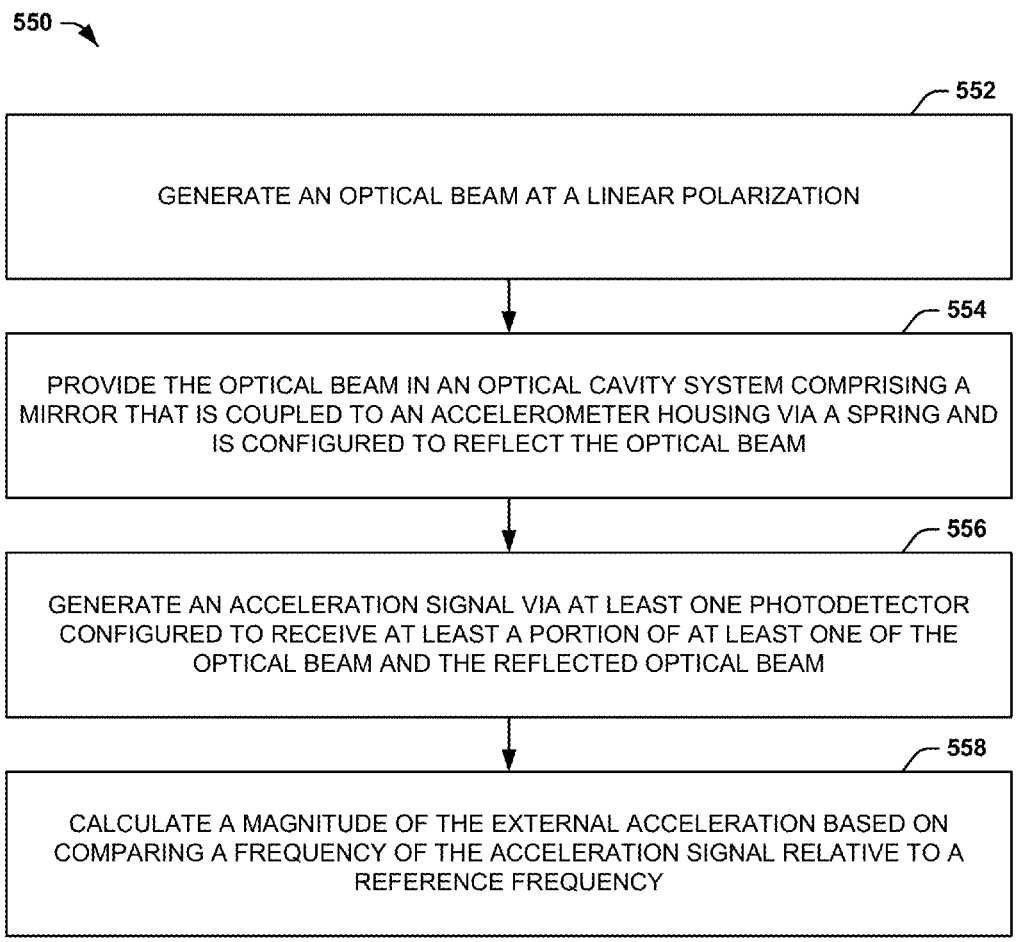
FIG. 12 illustrates an example of a method for measuring acceleration.

In view of the foregoing structural and functional features described above, a methodology in accordance with various aspects of the present invention will be better appreciated with reference to FIG. 12. While, for purposes of simplicity of explanation, the methodology of FIG. 12 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 12 illustrates an example of a method 550 for measuring acceleration. At 552, an optical beam (e.g., the optical beam 56) is generated at a linear polarization. At 554, the optical beam is provided in an optical cavity system (e.g., the optical cavity system 18) comprising a mirror (e.g., the mirror 60) that is coupled to an accelerometer housing (e.g., the accelerometer housing 62) via a spring (e.g., the spring 64) and is configured to reflect the optical beam. At 556, an acceleration signal (e.g., the acceleration signal ACCEL) is generated via at least one photodetector (e.g., the photodetector(s) 22) configured to receive at least a portion of at least one of the optical beam and the reflected optical beam (e.g., the reflected optical beam 68). The acceleration signal can be indicative of motion of the mirror resulting from an external acceleration acting upon the accelerometer housing. At 558, a magnitude of the external acceleration is calculated based on comparing a frequency of the acceleration signal relative to a reference frequency (e.g., the reference signal F-REF).

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. An accelerometer system comprising:
   a vertical-cavity surface-emitting laser (VCSEL) configured to oscillate between emitting an optical beam at a first linear polarization and emitting the optical beam at a second linear polarization perpendicular to the first linear polarization in response to the VCSEL receiving a reflected optical beam;
   an optical cavity system comprising a mirror that is coupled to an accelerometer housing via a spring and is configured to reflect the optical beam to provide the reflected optical beam, the optical cavity system also comprising at least one photodetector configured to receive at least a portion of at least one of the optical beam and the reflected optical beam to generate an acceleration signal based on the oscillation between the first linear polarization and the second linear polarization that is indicative of motion of the mirror resulting from an external acceleration acting upon the accelerometer housing; and
   an acceleration processor configured to calculate a magnitude of the external acceleration based on the acceleration signal.

2. The system of claim 1, wherein the optical cavity system further comprises a quarter-wave plate arranged between the VCSEL and the mirror and configured to convert the optical beam from the first linear polarization to a circular-polarization and to convert the reflected optical beam from the circular-polarization to the second linear polarization.

3. The system of claim 1, wherein the optical cavity system further comprises at least one polarization filter overlaying the respective at least one photodetector and being configured to substantially filter one of the first and second linear polarizations from the respective at least one photodetector.

4. The system of claim 1, wherein the acceleration signal comprises periodic transitions corresponding to the oscillation between the first and second linear polarizations of the reflected optical beam, and wherein the acceleration processor is configured to calculate the magnitude of the external acceleration based on a frequency of the periodic transitions of the acceleration signal.

5. The system of claim 1, wherein the at least one photodetector comprises a plurality of photodetectors that substantially surround and are substantially planar with a gain medium associated with the VCSEL.

6. The system of claim 5, wherein the plurality of photodetectors are configured to generate a respective plurality of acceleration signals, wherein the acceleration processor is configured to calculate the external acceleration based on the plurality of acceleration signals.

7. The system of claim 1, wherein the mirror is configured as a partially-silvered mirror configured to pass a portion of the optical beam to the at least one photodetector.

8. The system of claim 1, wherein the VCSEL is a first VCSEL and the optical cavity system is a first optical cavity system comprising a first mirror coupled to the accelerometer housing via a first spring and being configured to generate a first acceleration signal, the system further comprising:
   a second VCSEL configured to oscillate between emitting a second optical beam at the first linear polarization and emitting the second optical beam at the second linear polarization in response to the second VCSEL receiving a reflected second optical beam;
   a second optical cavity system comprising a second mirror that is coupled to the accelerometer housing via a second spring having a spring constant that is different from a spring constant associated with the first spring, the second mirror being configured to reflect the second optical beam to provide the reflected second optical beam, and the second optical cavity system comprising at least one second photodetector configured to receive at least a portion of one of the second optical beam and the reflected second optical beam and to generate a second acceleration signal based on the oscillation between the first linear polarization and the second linear polarization, the acceleration processor being configured to calculate the magnitude of the external acceleration based on a ratio of the first and second acceleration signals.

9. The system of claim 1, wherein the VCSEL is a first VCSEL and the optical cavity system is a first optical cavity system, the system further comprising:
   a second VCSEL configured to oscillate between emitting a second optical beam at the first linear polarization and emitting the second optical beam at the second linear polarization in response to the second VCSEL receiving a reflected second optical beam;
   a second optical cavity system comprising a second mirror that is coupled to the accelerometer housing and is configured to reflect the second optical beam to provide the reflected second optical beam, and comprising at least one second photodetector configured to receive at least a portion of one of the second optical beam and the reflected second optical beam and to generate a reference signal based on the oscillation between the first linear polarization and the second linear polarization, the acceleration processor being further configured to substantially compensate for temperature variation of the acceleration signal based on the reference signal.

10. The system of claim 1, wherein the VCSEL is a first VCSEL configured to emit a first optical beam and the optical cavity system comprises at least one first photodetector configured to receive the reflected first optical beam to generate a first acceleration signal, wherein the mirror is configured to reflect the first optical beam on a first surface, the system further comprising a second VCSEL configured to oscillate between emitting a second optical beam at the first linear polarization and emitting the second optical beam at the second linear polarization in response to the second VCSEL receiving a reflected second optical beam, the second optical beam being reflected from a second surface of the mirror opposite the first surface to provide the reflected second optical beam, wherein the optical cavity system further comprises at least one second photodetector configured to receive the reflected second optical beam to generate a second acceleration signal based on the oscillation between the first linear polarization and the second linear polarization, wherein the acceleration processor is configured to calculate the magnitude of the external acceleration based on a difference of the first and second acceleration signals relative to a sum of the first and second acceleration signals.

11. A multi-axis accelerometer system comprising a plurality of the accelerometer systems of claim 1, the plurality of accelerometer systems being arranged orthogonal with respect to each other.

12. A method for measuring acceleration, the method comprising:
generating an optical beam at a linear polarization;
providing the optical beam in an optical cavity system comprising a mirror that is coupled to an accelerometer housing via a spring and is configured to reflect the optical beam;
generating an acceleration signal via at least one photodetector configured to receive at least a portion of at least one of the optical beam and the reflected optical beam, the acceleration signal being indicative of motion of the mirror resulting from an external acceleration acting upon the accelerometer housing; and
calculating a magnitude of the external acceleration based on comparing a frequency of the acceleration signal relative to a reference frequency.

13. The method of claim 12, wherein generating the optical beam comprises periodically switching the linear polarization of the optical beam between a first linear polarization and a second linear polarization, and wherein generating the acceleration signal comprises generating the acceleration signal such that the frequency of the acceleration signal is based on a frequency of the periodic switching of the linear polarization of the optical beam between the first linear polarization and the second linear polarization.

14. The method of claim 12, further comprising:
generating a reference optical beam at the linear polarization;
providing the reference optical beam in a reference optical cavity system comprising a reference mirror that is statically coupled to a reference housing and is configured to reflect the reference optical beam;
generating a reference signal via at least one reference photodetector configured to receive at least a portion of at least one of the reference optical beam and the reflected reference optical beam, the reference signal having a frequency corresponding to the reference frequency.

15. The method of claim 12, wherein the optical beam is a first optical beam and the optical cavity system is a first optical cavity system comprising a first mirror coupled to the accelerometer housing via a first spring having a first spring constant and being configured to generate a first acceleration signal via at least one first photodetector, the method further comprising:
generating a second optical beam at the linear polarization;
providing the second optical beam in a second optical cavity system comprising a second mirror that is coupled to the accelerometer housing via a second spring having a second spring constant that is different from the first spring constant and is configured to reflect the second optical beam;
generating a second acceleration signal via at least one second photodetector configured to receive at least a portion of at least one of the second optical beam and the reflected second optical beam, the second acceleration signal being indicative of motion of the second mirror resulting from the external acceleration acting upon the accelerometer housing; and
calculating the magnitude of the external acceleration based on the respective frequencies of the first and second acceleration signals.

16. The method of claim 12, wherein the optical beam is a first optical beam and the optical cavity system is a first optical cavity system comprising a first surface of the mirror and being configured to generate a first acceleration signal via at least one first photodetector, the method further comprising:
generating a second optical beam at the linear polarization;
providing the second optical beam in a second optical cavity system comprising a second surface of the mirror opposite the first surface and which is configured to reflect the second optical beam;
generating a second acceleration signal via at least one second photodetector configured to receive at least a portion of the reflected second optical beam; and
calculating the magnitude of the external acceleration based on a difference of the respective frequencies of the first and second acceleration signals relative to a sum of the respective frequencies of the first and second acceleration signals.

17. An accelerometer system comprising:
a plurality of optical accelerometer detection systems that each correspond to one of a plurality of orthogonal axes, each of the plurality of optical accelerometer detection systems comprising:
a laser configured to emit an optical beam at a linear polarization that periodically transitions between a first linear polarization and a second linear polarization in response to a reflected portion of the optical beam;
an optical cavity system comprising:
a mirror that is coupled to an accelerometer housing via a spring and is configured to reflect the optical beam to provide the reflected optical beam;
a quarter-wave plate arranged between the laser and the mirror and configured to convert the optical beam from one of the first and second linear polarizations to a circular-polarization and to convert the reflected optical beam from the circular-polarization to the other of the first and second linear polarizations; and at least one photodetector configured to receive at least a portion of at least one of the optical beam and the reflected optical beam to generate an acceleration signal that is indicative of motion of the mirror resulting from an external acceleration acting upon the accelerometer housing in a respective one of the plurality of orthogonal axes based on the periodic transitions between a first linear polarization and a second linear polarization of the optical beam; and an acceleration processor configured to calculate a magnitude of the external acceleration based on the acceleration signal of each of the plurality of optical accelerometer detection systems.

18. The system of claim 17, wherein the laser is a first laser and the optical cavity system is a first optical cavity system comprising a first mirror coupled to the accelerometer housing via a first spring and being configured to generate a first acceleration signal, the system further comprising:

a second laser configured to emit a second optical beam at the linear polarization;

a second optical cavity system comprising a second mirror that is coupled to the accelerometer housing via a second spring having a spring constant that is different from a spring constant associated with the first spring, the second mirror being configured to reflect the second optical beam, and the second optical cavity system comprising at least one second photodetector configured to receive at least a portion of one of the second optical beam and the reflected second optical beam and to generate a second acceleration signal, the acceleration processor being configured to calculate the magnitude of the external acceleration based on a ratio of the first and second acceleration signals.

19. The system of claim 17, further comprising a reference system, the reference system comprising:

a reference laser configured to emit a reference optical beam at the linear polarization that periodically transitions between the first linear polarization and the second linear polarization in response to a reflected portion of the reference optical beam;

a reference optical cavity system comprising a reference mirror that is coupled to the accelerometer housing and is configured to reflect the reference optical beam, and comprising at least one reference photodetector configured to receive at least a portion of one of the reference optical beam and the reflected reference optical beam and to generate a reference signal, the acceleration processor being further configured to substantially compensate for temperature variation of the acceleration signal of each of the plurality of optical accelerometer detection systems based on the reference signal.

20. The system of claim 17, wherein the laser is a first laser configured to emit a first optical beam and the optical cavity system comprises a at least one first photodetector configured to receive the reflected first optical beam to generate a first acceleration signal, wherein the mirror is configured to reflect the first optical beam on a first surface, the system further comprising a second laser configured to emit a second optical beam at the linear polarization that is reflected from a second surface of the mirror opposite the first surface, wherein the optical cavity system further comprises at least one second photodetector configured to receive the reflected second optical beam to generate a second acceleration signal, wherein the acceleration processor is configured to calculate the magnitude of the external acceleration based on a difference of the first and second acceleration signals relative to a sum of the first and second acceleration signals.

21. The system of claim 17, wherein the acceleration signal comprises periodic transitions corresponding to the periodic transitions between the first and second linear polarizations of the optical beam, and wherein the acceleration processor is configured to calculate the magnitude of the external acceleration based on a frequency of the periodic transitions of the acceleration signal.

\* \* \* \* \*